United States Patent Office 3,215,694
Patented Nov. 2, 1965

3,215,694
QUINAZOLINE-2-CARBOXALDEHYDES, ACIDS, INTERMEDIATES AND PROCESS
Albert Israel Rachlin, Hackensack, Earl Reeder, Nutley, and Leo Henryk Sternbach, Upper Montclair, N.J., assignors to Hoffmann-La Roche Inc., Nutley, N.J., a corporation of New Jersey
No Drawing. Filed Sept. 6, 1963, Ser. No. 307,012
15 Claims. (Cl. 260—251)

The present invention relates to novel compounds and to methods of making such novel compounds. More particularly, the invention relates to novel quinazoline carboxaldehydes, compounds derived therefrom, novel intermediates useful in the preparation thereof, and to methods for making the same.

The novel compounds of the present invention may be represented by the formula

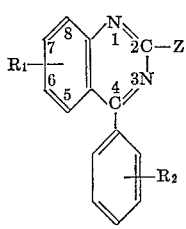

(A)

wherein $R_1$ and $R_2$ are selected from the group consisting of hydrogen, halogen, trifluoromethyl, nitro, lower alkylthio and lower alkyl and Z is selected from the group consisting of a CHO group, a COOH group, a CH=N lower alkyl group, and a

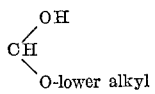

group.

The novel quinazoline carboxaldehydes, to which this invention relates, have the formula of

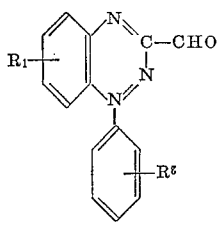

(I)

wherein $R_1$ and $R_2$ are as above. Compounds wherein $R_1$ is halogen and $R_2$ is hydrogen are preferred. Especially preferred are those compounds wherein $R_1$ is halogen and is attached to the ring nucleus at the six position and $R_2$ is hydrogen.

Novel compounds derived from such quinazoline carboxaldehydes, which are included within the purview of the present invention, have the following formula

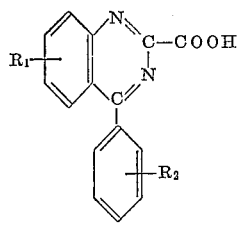

(II)

wherein $R_1$ and $R_2$ have the same meaning as ascribed thereto hereinabove.

Novel compounds useful in the preparation of compounds corresponding to Formula I above have the formula

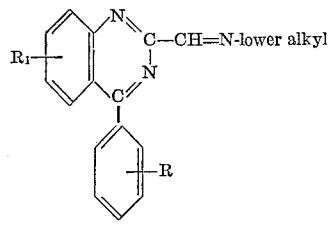

(III)

wherein $R_1$ and $R_2$ are as above.

Novel compounds also useful in the preparation of compounds of Formula I above have the formula

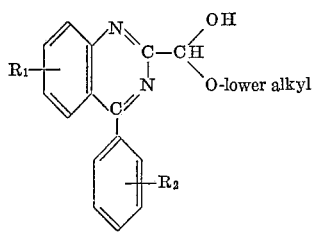

(IV)

wherein $R_1$ and $R_2$ are as above.

The numbering of the quinazoline ring system is given in Formula A above for the purpose of convenience.

The term "lower alkyl" as used throughout the instant disclosure is intended to connote both straight and branched chain lower alkyl groups such as methyl, ethyl, propyl, isopropyl and the like. The term "halogen" as used hereinabove and hereinafter represents all four forms thereof, i.e., chlorine, bromine, iodine and fluorine.

The compounds of Formulae I and II above form pharmaceutically acceptable acid addition salts with both inorganic and organic pharmaceutically acceptable acids such as hydrochloric acid, hydrobromic acid, nitric acid, sulfuric acid, phosphoric acid, succinic acid, formic acid, acetic acid, citric acid, methane-sulfonic acid, p-toluenesulfonic acid and the like. Such acid addition salts are also included within the scope of the present invention. Compounds of Formula II also form salts with pharmaceutically acceptable bases such as sodium hydroxide.

Compounds of Formula I above can be prepared by reacting a compound selected from the group consisting of compounds of the formulae

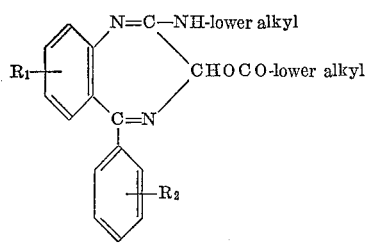

(V)

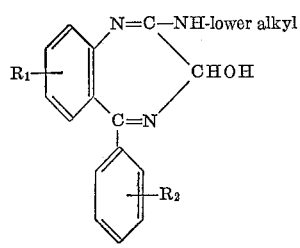

(IV)

and

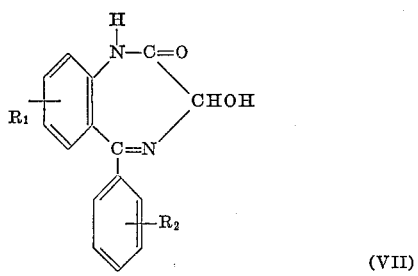

wherein $R_1$ and $R_2$ are as above with an acid agent in the presence of a solvent.

The last mentioned reaction can be effected at room temperature, at below room temperature or at above room temperature and/or at elevated or depressed pressures. Temperature, however, is not a critical factor in the subject reaction. Of course, the temperature should not be so high as to cause decomposition of any of the reactants or of the desired end products.

Any acid agent capable of donating a proton is suitable for the purpose of the present invention. Representative of such acid agents are mineral acids, suitably strong mineral acids, e.g., hydrochloric acid, sulfuric acid, nitric acid, perchloric acid, hydrobromic acid and the like. As suitable solvents may be included an ether, e.g., dioxane and the like; a lower alkanol, e.g., methanol, ethanol and the like; a lower alkanone, e.g., acetone and the like; an aqueous mixture of such solvents; water; or any other suitable solvent.

In a preferred aspect, the reaction is performed in a water-containing acidic medium such as, for example, an aqueous solution of a strong inorganic acid agent which ionizes readily, such as hydrochloric acid and the like. In order to secure sufficient solution of the starting material to effect the desired result, an additional solvent such as, for example, dioxane or an alkanol can be present in the water-containing medium to enhance the solubility of the starting material and/or the end product.

Compounds corresponding to Formula I above are, in the preferred aspect, isolated from the reaction medium in which they are prepared. However, such compounds can be further reacted either with or without isolation from the reaction medium in which they are produced to form compounds corresponding to Formula II above.

For example, compounds corresponding to Formula I above may be subjected to the action of oxygen whereby to form the corresponding 2-quinazolinecarboxylic acid of Formula II above. The oxidation can be effected by any convenient technique such as treating compounds corresponding to Formula I above with an oxidizing system containing potassium dichromate and sulfuric acid or sodium hypochlorite, silver oxide and peracids such as peracetic acid and the like, or sodium hydroxide and sodium hypochlorite.

Furthermore, if the acid agent employed in the preparation of compounds corresponding to Formula I above is contained in an aqueous medium which includes a lower alkanol such as methanol, ethanol and the like, the resulting carboxaldehyde may be converted to a hemiacetal corresponding to the Formula IV above. The reconversion of the hemiacetal of Formula IV above to the carboxaldehyde of Formula I above can be effected by any conventional hydrolysis technique or by upsetting the equilibrium of the reaction mixture, i.e., by removing the alkanol by azeotropic distillation.

Compounds corresponding to Formula I above can also be prepared by means of the hydrolysis of compounds corresponding to Formula III above. This end can be suitably achieved by any convenient technique such as the treatment of a compound having the Formula III above with an excess of an aqueous solution of an acid such as hydrochloric acid.

Compounds corresponding to Formula III above can be synthesized by treating a 2-chloromethyl-4-phenyl-quinazoline-1-oxide with an amine. Representative of amines suitable for the preparation of compounds of Formula III above are lower alkyl primary amines such as methylamine, ethylamine and the like. Preferably, the reaction is effected in the presence of a convenient solvent such as a lower alkanol, e.g., methanol, ethanol and the like.

The compounds of Formulae I and II above are useful as muscle relaxants. Said compounds or their pharmaceutically acceptable acid addition salts, can be administered, with dosage adjusted to individual requirements, in conventional pharmaceutical dosage forms. For example, they can be administered internally, i.e. parenterally in the form of tablets, suspensions, solutions, capsules, dragees and the like.

Especially preferred for the purposes of the present invention are those compounds of Formulae I, II, III, and IV above wherein $R_1$ is halogen, preferably chlorine and $R_2$ is hydrogen. In a more preferred embodiment, the said halogen is positioned on the quinazoline carboxaldehyde nucleus at the 6-position.

The following examples are illustrative, but not limitative, of the invention. All temperatures are in degrees centigrade.

*Example 1*

A suspension of 3.4 g. of 3-acetoxy-7-chloro-2-methylamino-5-phenyl-3H-1,4-benzodiazepine in 140 ml. of water and 10 ml. of 1 N hydrochloric acid was heated to 82° for 10 minutes. The precipitate which formed was separated by filtration and dissolved in ether. After the ether solution was dried and concentrated, a crystalline material appeared which was separated by filtration. Recrystallization of the crystalline material from ether yielded 6-chloro-4-phenyl-2-quinazoline carboxaldehyde as slightly yellow prisms melting at 177–178°.

The above-mentioned 7-chloro-2-methylamino-3-acetoxy-5-phenyl-3H-1,4-benzodiazepine, intermediates therefor, and the preparation thereof, are not part of this invention, but such are set forth hereinbelow in order that this disclosure may be complete.

To a solution of 64 g. of 7-chloro-2-methylamino-5-phenyl-3H-1,4-benzodiazepine 4-oxide in 600 ml. of dimethylformamide, 25.2 ml. of acetyl chloride was added with outside cooling. Crystals of 7-chloro-2-methylamino-3-acetoxy-5-phenyl-3H-1,4-benzodiazepine hydrochloride started to precipitate after a short time and were filtered off after about one hour. After recrystallization from a mixture of ethanol and petroleum ether, the product former colorless needles melting at 212–213°.

*Analysis.*—Calcd. for $C_{18}H_{16}N_3O_2Cl$: C, 57.15; H, 4.53. Found: C, 56.99; H, 4.80.

The above-described 7-chloro-2-methylamino-3-acetoxy-5-phenyl-3H-1,4-benzodiazepine hydrochloride was treated with an excess of ice cold dilute sodium hydroxide, and the liberated base was extracted with methylene chloride. The methylene chloride layer was separated, dried and concentrated in vacuo, and the residue was crystallized from a mixture of methylene chloride and ether to yield colorless prisms of 7-chloro-2-methylamino-3-acetoxy-5-phenyl-3H-1,4-benzodiazepine melting at 202–203°.

*Analysis.*—Calcd. for $C_{18}H_{16}N_3O_2Cl$: C, 63.25; H, 4.72; N, 12.30; acetyl, 12.6. Found: C, 63.12; H, 4.77; N, 12.46, 12.47; acetyl, 12.94.

*Example 2*

A solution of 2.9 g. of 7-chloro-2-methylamino-3-hydroxy-5-phenyl-3H-1,4-benzodiazepine in 640 ml. of water and 20 ml. of 1 N hydrochloric acid was left at room temperature for 72 hours yielding 6-chloro-4-phenyl-2-quinazoline carboxaldehyde as a precipitate. The almost pure crystalline product was separated by filtration. It melted at 177–178°.

The above-mentioned 7-chloro-2-methylamino-3-hydroxy-5-phenyl-3H-1,4-benzodiazepine and the preparation thereof are not part of the present invention, but such are set forth hereinbelow in order that this disclosure may be complete.

A solution of 3.4 g. of 7-chloro-2-methylamino-3-acetoxy-5-phenyl-3H-1,4-benzodiazepine, in a mixture of 50 ml. of dioxane and 10 ml. of 1 N sodium hydroxide, was stirred at room temperaure for 4 hours and then concentrated in vacuo to a small volume. Water was added, and the reaction product was extracted with methylene chloride. The organic layer was dried, concentrated in vacuo and the residual oil was crystallized from either. After recrystallization from a mixture of methylene chloride and petroleum ether, colorless needles of 7-chloro-2-methylamino-3-hydroxy-5-phenyl-3H - 1,4 - benzodiazepine melting at 184–186° where obtained.

*Analysis.*—Calcd. for $C_{16}H_{14}ClN_3O$: C, 64.11; H. 4.71; N, 14.02. Found: C, 64.11; H, 4.98; N, 13.58.

Example 3

A suspension of 5.6 g. of 7-chloro-3-hydroxy-5-phenyl-1,3-dihydro-2H-1,4-benzodiazepin-2-one in a mixture of 200 ml. of dioxane, 200 ml. of water and 40 ml. of 1 N hydrochloric acid was heated on the steam bath for 15 minutes. The resultant mixture was cooled to room temperature and concentrated in vacuo. Methylene chloride and 40 ml. of 1 N sodium hydroxide were added to the reaction mixture and some undissolved starting material was separated by filtration. The organic layer from the filtrate was separated, dried and concentrated in vacuo to drynesss. The residue was crystallized from either yielding 6-chloro-4-phenyl - 2 - quinazoline carboxaldehyde. After recrystallization from ether, the purified product melted at 177–178°.

Example 4

A suspension of 6.4 g. of 3-chloromethyl-4-phenyl-6-chloroquinazoline 1-oxide in 100 cc. of methanolic methylamine (37 per cent) was stirred at room temperature. After 150 minutes, the solid had dissolved and the resulting homogeneous solution was allowed to stand for 20 hours. The solvent was evaporated in vacuo and the residue was partitioned between 200 cc. of methylene chloride and 75 cc. of water. The organic layer, after being washed with water, dried over sodium sulfate and evaporated in vacuo, yielded 2-(N-methylformimidoyl)-4-phenyl-6-chloroquinazoline. Recrystallized from 30 cc. of ethyl acetate, the material melted at 154–155°.

Example 5

A suspension of 1.0 g. of 6-chloro-4-phenyl-2-quinazoline-carboxaldehyde in 50 ml. of 10 percent sodium hydroxide and 20 ml. of sodium hydrochlorite (16.7 percent active chlorine) was stirred and heated on a steam bath for 2½ hours. During this time there was a change in the crystal form. After cooling, the solid was separated by filtration and partitioned between chloroform and dilute hydrochloric acid. The chloroform layer was separated, washed with water and concentrated to dryness after drying over sodium sulfate. The residue was crystallized from a mixture of acetone and hexane to give 6-chloro-4-phenyl-2-quinazoline carboxylic acid melting at 207–209° dec. Further crystallization from benzene raised the melting point to 212.5–213.5°.

Example 6

A solution of 5 g. of 2-(N-methylformimidoyl)-4-phenyl-6- chloroquinazoline in an excess of dilute hydrochloric acid has heated on a steam bath for one hour. The resultant mixture was neutralized and cooled. A precipitate fromed which was separated by filtration. The precipitate was recrystallized from ether and found to be 6-chloro-4-phenyl-2-quinazoline carboxaldehyde.

Example 7

A solution of 3 g. of 7-chloro-2-methylamino-3-hydroxy-5-phenyl-3H-1,4-benzodiazepine in 50 ml. of ethanol and 10 ml. of 1 N hydrochloric acid was heated on a steam bath for 10 minutes. The solution was concentrated in vacuo to a smaller volume and the crude crystalline product was separated by filtration. Recrystallization from ethanol yielded 6-chloro-4-phenyl-2-quinazoline carboxaldehyde ethyl hemiacetal as colorless needles which melt at 101–103°.

Example 8

A solution of 0.7 g. of 6-chloro-4-phenyl-2-quinazoline carboxaldehyde ethyl hemiacetal in 25 ml. of benzene was refluxed for 7 minutes with azeotropic distillation of the solvent. The solution was concentrated in vacuo to dryness and the residue crystallized from ether to give 6-chloro-4-phenyl-2-quinazoline carboxaldehyde.

We claim:
1. A compound selected from the group consisting of compounds of the formula

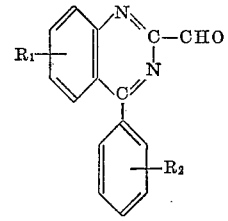

and their pharmaceutically acceptable acid addition salts, wherein $R_1$ and $R_2$ are selected from the group consisting of hydrogen, halogen, trifluoromethyl, nitro, lower alkylthio and lower alkyl.

2. A compound of the formula

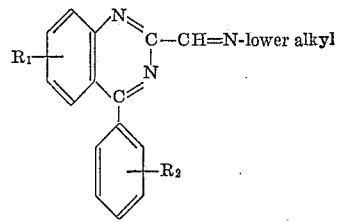

wherein $R_1$ and $R_2$ are selected from the group consisting of hydrogen, halogen, trifluoromethyl nitro, lower alkylthio and lower alkyl.

3. A process for the preparation of a compound of the formula

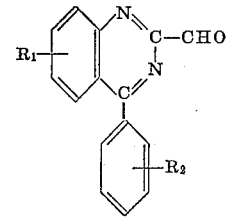

wherein $R_1$ and $R_2$ are selected from the group consisting of hydrogen, halogen, trifluoromethyl, nitro, lower alkylthio and lower alkyl which comprises reacting a compound selected from the group consisting of compounds of the formulae

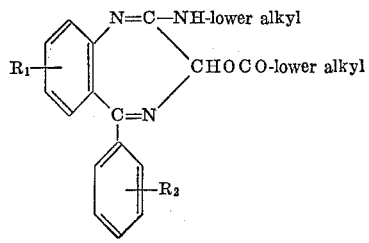

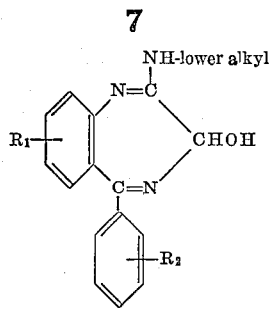

and

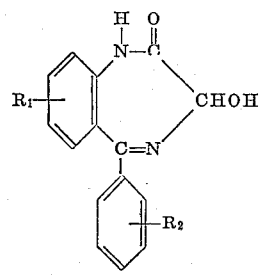

wherein $R_1$ and $R_2$ are as above with a proton-containing acid agent in the presence of a solvent system.

4. A process for the preparation of a compound of the formula

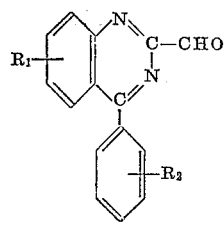

wherein $R_1$ and $R_2$ are selected from the group consisting of hydrogen, halogen, trifluoromethyl, nitro, lower alkylthio and lower alkyl which comprises reacting a compound selected from the group consisting of compounds of the formulae

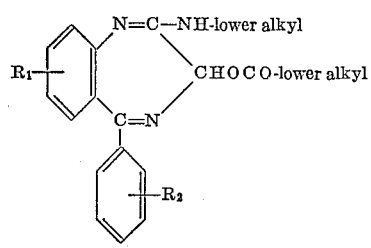

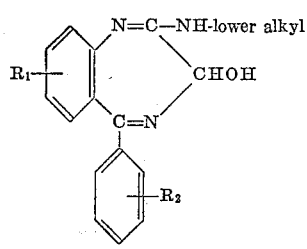

and

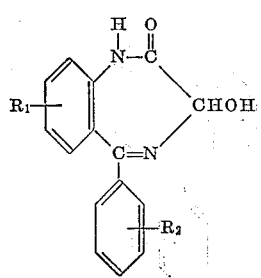

wherein $R_1$ and $R_2$ are as above with an aqueous solution of a mineral acid.

5. A process which comprises reacting a compound of the formula

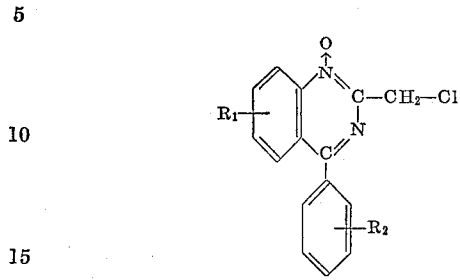

wherein $R_1$ and $R_2$ are selected from the group consisting of hydrogen, halogen, trifluoromethyl, nitro, lower alkylthio and lower alkyl with a lower alkyl primary amine to thereby prepare a compound of the formula

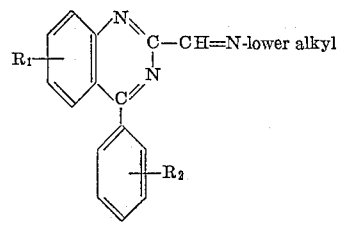

wherein $R_1$ and $R_2$ have the same meaning as ascribed thereto hereinabove.

6. A process as defined in claim 5 wherein the amine utilized is methylamine.

7. 6-chloro-4-phenyl-2-quinazoline carboxaldehyde.

8. 2-(N-lower alkyl - formimidoyl)-4-phenyl-6-chloro-quinazoline.

9. 2-(N-methyl - formimidoyl)-4-phenyl-6-chloroquinazoline.

10. 6-chloro-4-phenyl - 2 - quinazoline carboxaldehyde lower alkyl hemiacetal.

11. 6-chloro-4-phenyl - 2 - quinazoline carboxaldehyde ethyl hemiacetal.

12. 6-chloro-4-phenyl-2-quinazoline carboxylic acid.

13. A process which comprises treating a compound selected from the group consisting of compounds of the formulae

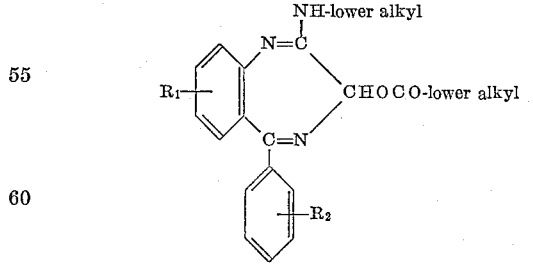

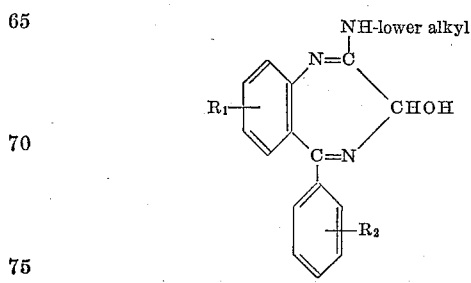

and

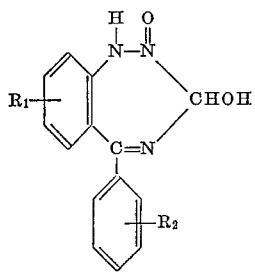

wherein $R_1$ and $R_2$ are selected from the group consisting of hydrogen, halogen, trifluoromethyl, nitro, lower alkylthio and lower alkyl with an aqueous alkanolic solution of a mineral acid to thereby prepare a compound of the formula

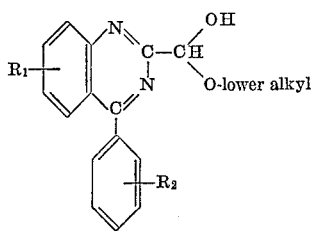

wherein $R_1$ and $R_2$ are as above.

14. A compound of the formula

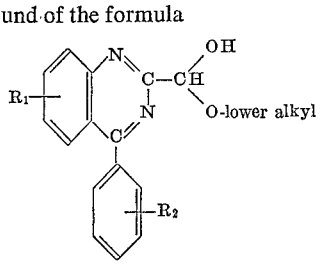

wherein $R_1$ and $R_2$ are selected from the group consisting of hydrogen, halogen, trifluoromethyl nitro, lower alkylthio and lower alkyl.

15. A compound of the formula

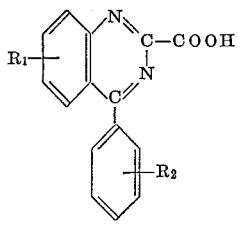

wherein $R_1$ and $R_2$ are selected from the group consisting of hydrogen, halogen, trifluoromethyl, nitro, lower alkylthio and lower alkyl.

No references cited.

NICHOLAS S. RIZZO, *Primary Examiner.*

UNITED STATES PATENT OFFICE
CERTIFICATE OF CORRECTION

Patent No. 3,215,694                      November 2, 1965

Albert Israel Rachlin et al.

It is hereby certified that error appears in the above numbered patent requiring correction and that the said Letters Patent should read as corrected below.

Column 1, lines 42 to 51, the formula should appear as shown below instead of as in the patent:

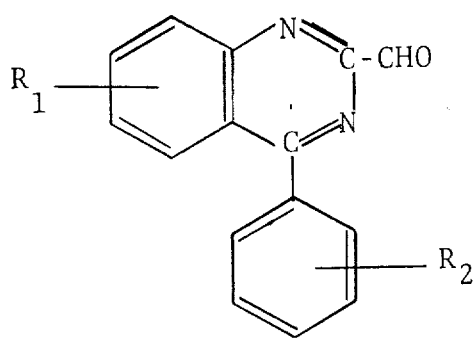

column 2, lines 4 to 13, for that portion of the formula reading

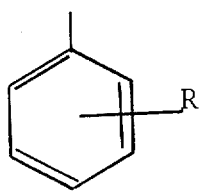     read     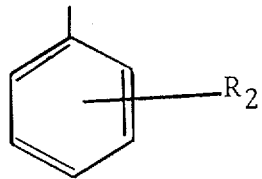

line 71, for "(IV)" read -- (VI) --; column 4, lines 15 and 16, for "parenterally in the form" read -- parenterally or enterally in the form --; line 52, for "former" read -- formed --; column 5, line 13, for "either" read -- ether --; line 17, for "where" read -- were --; line 33, for "either" read -- ether --; line 38, for "3-chloromethyl-" read -- 2-chloromethyl- --; lines 43 and 44, for "the residue" read -- the solid residue --; line 54, for "hydrochlorite" read -- hypochlorite --; column 9, lines 1 to 13, the formula should appear as shown below instead of as in the patent:

3,215,694

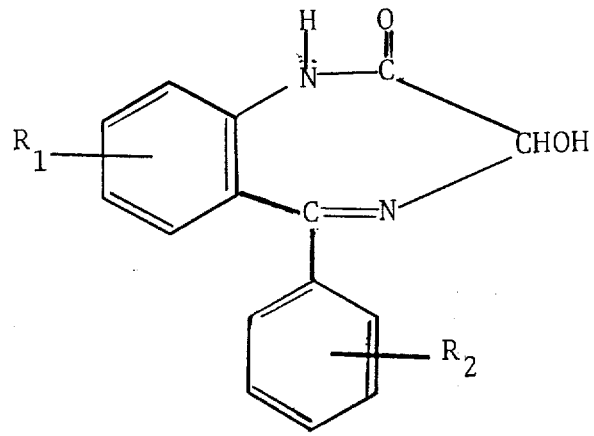

Signed and sealed this 18th day of October 1966.

(SEAL)
Attest:

ERNEST W. SWIDER
Attesting Officer

EDWARD J. BRENNER
Commissioner of Patents